United States Patent
Pedemonte et al.

Patent Number: 5,931,976
Date of Patent: Aug. 3, 1999

[54] ORANGE DYE MIXTURES OF FIBER-REACTIVE AZO DYES AND USE THEREOF FOR DYEING MATERIAL CONTAINING HYDROXY-AND/OR CARBOXAMIDO GROUPS

[75] Inventors: Ronald P. Pedemonte, Eppstein-Vockenhausen; Werner Russ, Flörsheim-Weilbach, both of Germany

[73] Assignee: DyStar Textilfarben GmbH & Co. Deutschland KG, Germany

[21] Appl. No.: 09/132,318

[22] Filed: Aug. 11, 1998

[51] Int. Cl.⁶ .......................... D06P 1/382; D06P 1/384; D06P 3/66
[52] U.S. Cl. .......................... 8/549; 8/641; 8/918; 8/924
[58] Field of Search .................. 8/549, 641, 918, 8/924

[56] References Cited

U.S. PATENT DOCUMENTS 5,349,057  9/1994  Büch et al. .......................... 534/637

*Primary Examiner*—Margaret Einsmann
*Attorney, Agent, or Firm*—Connolly & Hutz

[57] ABSTRACT

The present invention concerns orange dye mixtures of fiber-reactive azo dyes, suitable for dyeing hydroxy- and/or carboxamido-containing material, such as cellulose fibers, like cotton, or wool and nylon, which comprise one or more monoazo dyestuffs corresponding to the general formula (1) and one or more monoazo dyestuffs corresponding to the formula (2)

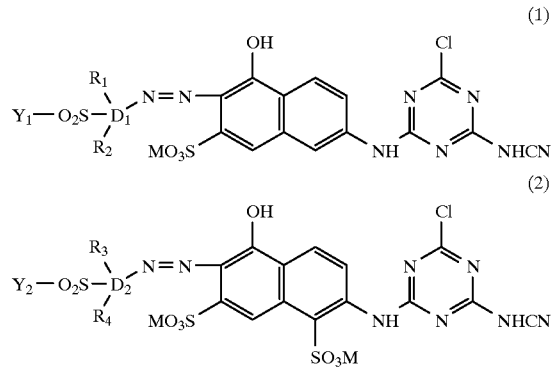

in which $D_1$ and $D_2$ are each, independently from one another, a radical of a benzene or naphthalene nucleus, $R_1$, $R_2$, $R_3$ and $R_4$ are each, independently from one another, hydrogen, methyl, ethyl, methoxy, ethoxy, sulfo or carboxy, M is hydrogen or an alkali metal and the groups $Y_1$—$SO_2$— and $Y_2$—$SO_2$— are each fiber reactive groups of the vinyl-sulfone series.

11 Claims, No Drawings

ORANGE DYE MIXTURES OF FIBER-REACTIVE AZO DYES AND USE THEREOF FOR DYEING MATERIAL CONTAINING HYDROXY-AND/OR CARBOXAMIDO GROUPS

The present invention concerns orange dye mixtures of fiber-reactive azo dyes, suitable for dyeing hydroxy- and/or carboxamido-containing material, which comprise one or more, such as two or three, monoazo dyestuffs corresponding to the general formula (1) and one or more, such as two or three, monoazo dyestuffs corresponding to the formula (2)

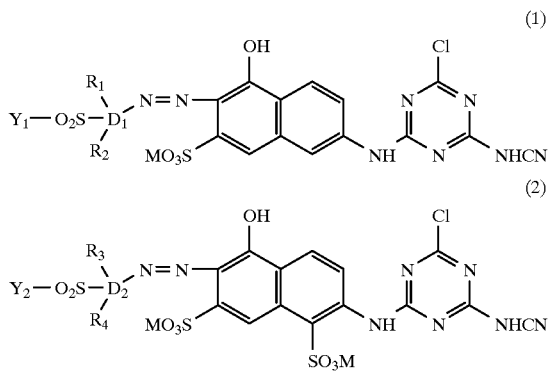

in which $D_1$ is the radical of a benzene or naphthalene nucleus, the azo group preferably being bonded in the 2-position in the case of the naphthalene nucleus;

$D_2$ has one of the meanings of of $D_1$;

$R_1$ is hydrogen, methyl, ethyl, methoxy, ethoxy, sulfo or carboxy, if $D_1$ or $D_2$ or both are a benzene radical, preferably methyl, methoxy or hydrogen and in particular preferably hydrogen, and is, if $D_1$ or $D_2$ or both are a naphthalene radical, hydrogen, sulfo or carboxy, preferably hydrogen or sulfo;

$R_2$ is hydrogen, methyl, ethyl, methoxy, ethoxy, sulfo or carboxy, if $D_1$ or $D_2$ or both are a benzene radical, preferably methyl, methoxy or hydrogen and in particular preferably hydrogen, and is, if $D_1$ or $D_2$ or both are a naphthalene radical, hydrogen, sulfo or carboxy, preferably hydrogen;

$R_3$ is hydrogen, methyl, ethyl, methoxy, ethoxy, sulfo or carboxy, if $D_1$ or $D_2$ or both are a benzene radical, preferably methyl, methoxy or hydrogen and in particular preferably hydrogen, and is, if $D_1$ or $D_2$ or both are a naphthalene radical, hydrogen, sulfo or carboxy, preferably hydrogen or sulfo;

$R_4$ is hydrogen, methyl, ethyl, methoxy, ethoxy, sulfo or carboxy, if $D_1$ or $D_2$ or both are a benzene radical, preferably methyl, methoxy or hydrogen and in particular preferably hydrogen, and is, if $D_1$ or $D_2$ or both are a naphthalene radical, hydrogen, sulfo or carboxy, preferably hydrogen;

$Y_1$ is vinyl or is ethyl which is substituted in the β-position by a substituent which is eliminated by the action of an alkali, forming the vinyl group, such as chlorine, thiosulfato, sulfato, alkanoyloxy of 2 to 5 carbon atoms, such as acetyloxy, phosphato, sulfobenzoyloxy and p-toluylsulfonyloxy, and $Y_1$ is preferably vinyl, β-chloroethyl, β-thiosulfatoethyl or β-sulfatoethyl and is in particular preferably vinyl or β-sulfatoethyl;

$Y_2$ has one of the meanings of $Y_1$;

M is hydrogen or an alkali metal, such as lithium, sodium and potassium;

the groups $—SO_2—Y$ are preferably bonded to the benzene ring, if $D_1$ or $D_2$ or both are a benzene radical, in meta- or preferably para-position relative to the azo group.

Both in the formulae mentioned above and in those below the individual formula members, both with different and with the same designation within a formula, can within the scope of their definition have meanings which are the same as or different from one another.

The groups "sulfo", "thiosulfato", "carboxy", "phosphato" and "sulfato" include both the acid form and the salt form of these groups. Accordingly, sulfo groups are groups of the formula $—SO_3M$, thiosulfato groups are groups of the formula $—S—SO_3M$, carboxy groups are groups of the formula $—COOM$, phosphato groups are groups of the formula $—OPO_3M_2$ and sulfato groups are groups of the formula $—OSO_3M$, in which M is defined as above.

The dyes according to the general formulae (1) and (2) are known from the U.S. Pat. No. 5,349,057.

In general, the azo dyestuff or dyestuffs of the formula (1) and the azo dyestuff or dyestuffs of the formula (2) are contained in the mixture in a mixing ratio of 90:10% by weight to 10:90% by weight, preferably in a ratio of 70:30% to 30:70% by weight and particularly preferable in a ratio of 60:40% to 40:60% by weight.

The novel dye mixtures according to the invention composed from dyes of formula (1) and formula (2) are surprisingly advantageous over the individual dyestuffs of formula (1) as well as (2). For example, they provide advantages in respect to color build-up and solubility in aqueous dyebaths in the presence of alkali and electrolyte salts over these individual dyes and are distinguished by a very high tinctorial strength; the color yields of the dyeings obtained with the dye mixtures are surprisingly significantly higher than the average of the sum of the color yields of the dyeings obtained with said individual dyes. The synergistic effect of the dye mixtures of the invention with regard to the individual dyestuffs of the mixture, not to be expected, means a high economical advantage in addition.

Radicals of the formulae $Y_1—O_2S—D_1—(R_1,R_2)—$ and $Y_2—O_2S—D_2—(R_3, R_4)—$ of the azo dyestuffs of the formulae (1) and (2) are, for example, 3-(β-sulfatoethylsulfonyl)-phenyl, 4-(β-sulfatoethylsulfonyl)-phenyl, 2-methyl-5-(β-sulfatoethylsulfonyl)-phenyl, 2-methoxy-5-(β-sulfatoethylsulfonyl)-phenyl, 4-methyl-3-(β-sulfatoethylsulfonyl)-phenyl, 2,5-dimethyl-(β-sulfatoethylsulfonyl)-phenyl, 2,6-dimethyl4-(β-sulfatoethylsulfonyl)-phenyl, 2-methoxy4-(β-sulfatoethylsulfonyl)-phenyl, 4-methoxy-5-(β-sulfatoethylsulfonyl)-phenyl, 2,4-dimethoxy-5-(β-sulfatoethylsulfonyl)-phenyl, 2,5-dimethoxy4-(β-sulfatoethylsulfonyl)-phenyl, 6-(β-sulfatoethylsulfonyl)-1-sulfo-naphthyl-2-yl and 8-(β-sulfatoethylsulfonyl)-6-sulfonaphthyl, and of these in particular 4-(β-sulfatoethylsulfonyl)-phenyl, and derivatives of these radicals in which the β-sulfatoethylsulfonyl group is replaced by the vinylsulfonyl or β-thiosulfatoethysulfonyl or β-chloroethylsulfonyl group.

Preferably, in the formulae (1) and (2), the radicals $D_1$ and $D_2$ are benzene nuclei.

The dye mixtures of the invention can be prepared in solid or in liquid (dissolved) form. In solid form they generally contain the electrolyte salts customary in the case of water-soluble and in particular fiber-reactive dyes, such as sodium chloride, potassium chloride and sodium sulfate, and also assistants customary in commercial dyes, such as buffer substances capable of establishing a pH in aqueous solution between 3 and 7, such as sodium acetate, sodium borate, sodium bicarbonate, sodium citrate, sodium dihydrogenphosphate and disodiumhydrogenphosphate, small amounts of siccatives or if, they are present in liquid, aqueous solution (including the presence of thickeners of the type customary in print pastes), substances which ensure the permanence of these preparations, for example mold preventatives.

In general, the dye mixtures will take the form of dye powders containing from 10 to 80% by weight, based on the dye powder or preparation, of a strength-standardizing colorless diluent electrolyte salt. These dye powders may in addition contain the abovementioned buffer substances in a total amount of up to 5%, based on the dye powder. If the dye mixtures of the invention are present in aqueous solution, the total dye content of these aqueous solutions is up to about 50% by weight, for example between 5 and 50% by weight, the electrolyte salt content of these aqueous solutions preferably being below 10% by weight, based on the aqueous solution; the aqueous solutions (liquid preparations) can in general contain the abovementioned buffer substances in an amount of up to 5% by weight, preferably up to 2% by weight.

The dye mixtures of this invention can be obtained in a conventional manner, for instance by mechanically mixing the individual dyes in solid form or in form of aqueous solutions in the required proportions or by synthesis by means of the customary diazotization and coupling reactions using appropriate mixtures of the diazo and coupling components in a manner familiar to those skilled in the art and the necessary proportions. One option of preparing the dye mixtures by chemical synthesis is for example to prepare an aqueous solution of the two coupling components 3-(2'-chloro4'-cyanoamino-1',3',5'-triazin-6'-yl)-amino-6-sulfo-8-naphthol and 3-(2'-chloro4'-cyanoamino-1',3',5'-triazin-6'-yl)-amino4,6-disulfo-8-naphthol (which may first be synthesized in a manner as described in U.S. Pat. No. 5,349,057 together in the same reaction batch by employing the starting compounds 3-amino-6-sulfo-8-naphthol and 3-amino-4,6-disulfo-8-naphthol, cyanuric chloride and the alkali metal salt of cyanamide in in the appropriate proportions) and, as diazo components, of the aniline compounds of the formula (4a) and (4b)

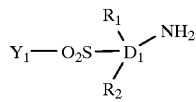

(4a)

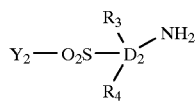

(4b)

where $R_1$, $R_2$, $R_3$, $R_4$, $Y_1$ and $Y_2$ are each as defined above, in the appropriate proportions in the same reaction batch, diazotizing these aniline compounds in a conventional manner in a strongly acid medium and then carrying out the coupling reactions with said coupling components at a pH of between 2 and 7, preferably between 3 and 5.

The two starting (cyanoamino-chloro-triazinyl)-aminonaphthol compounds may advantageously be prepared by reacting, in the same reaction batch, 7-amino-4-hydroxy-naphthalene-2-sulfonic acid and 2-amino-5-hydroxy-naphtalene-1,7-disulfonic acid in mixture with cyanoamino-dichloro-triazine, each in the appropriate proportion, at a temperature of between 20° and 40° C., starting under weakly to medium acid conditions, such as at a pH of between 2 and 6, preferably between 3 and 5, and thereafter under stronglly acid condtions, such as at a pH of less than 2, preferably at a pH of between 1 and 2. This method can also be varied by adding to the cyanoamino-dichloro-triazine first the above-mentioned monosulfonic acid for reaction in a weakly to medium acid medium and then adding the above-mentioned disulfonic acid for reaction in a strongly acid medium.

The dye mixtures according to the invention prepared by a chemical route can be separated out from their synthesis solution by generally known methods, thus, for example, either by precipitation from the reaction medium by means of electrolytes, such as for example, sodium chloride or potassium chloride, or by evaporation or spray-drying of the reaction solution, it being possible for a buffer substance to be added to this reaction solution.

Starting compounds of the formulae (4a) and (4b) are, for example, 3-(β-sulfatoethylsulfonyl)-aniline, 4-(β-sulfatoethylsulfonyl)-aniline, 2-methyl-5-(β-sulfatoethylsulfonyl)-aniline, 2-methoxy-5-(β-sulfatoethylsulfonyl)-aniline, 4-methyl-3-(β-sulfatoethylsulfonyl)-aniline, 2,5-dimethyl-(β-sulfatoethylsulfonyl)-aniline, 2,6-dimethyl4-(β-sulfatoethylsulfonyl)-aniline, 2-methoxy4-(β-sulfatoethylsulfonyl)-aniline, 4-methoxy-5-(β-sulfatoethylsulfonyl)-aniline, 2,4-dimethoxy-5-(β-sulfatoethylsulfonyl)-aniline, 2,5-dimethoxy4-(β-sulfatoethylsulfonyl)-aniline, 6-(1-sulfatoethylsulfonyl)-1-sulfo-2-amino-naphthalene and 8-(β-sulfatoethylsulfonyl)-6-sulfo-2-amino-naphthalene, and of these in particular 4-(β-sulfatoethylsulfonyl)-aniline, and derivatives of these radicals in which the β-sulfatoethylsulfonyl group is replaced by the vinylsulfonyl or β-thiosulfatoethysulfonyl or β-chloroethylsulfonyl group.

The dye mixtures according to the invention can comprise further fiber-reactive dyestuffs, which serve to shade the dyestuff mixture, in an amount of up to 5% by weight. These "shading dyestuffs" can be added by customary mixing or else, if one or more of the components of the shading dyestuff are identical to the components of the dyestuffs of the formulae (1) and/or (2), can be prepared and introduced into the dyestuff mixture by a chemical route in the same reaction batch together with the synthesis described above for a dye mixture according to this invention. Thus, to prepare a dye mixture according to the invention having a content of shading dyestuff with a particular chromophore, for example, those additional starting compounds which are 3-carboxy- or 3-methyl-5-pyrazolone can be employed in the reaction mixture.

The dye mixtures according to the invention have valuable properties. They are used for dyeing (which includes printing) materials containing hydroxy and/or carboxamide groups, for example in the form of sheet-like structures, such as paper and leather, or of films, such as, for example, of polyamide, or in bulk, such as, for example, polyamide and polyurethane, but in particular these materials in fiber form. The solution of the dye mixtures according to the invention obtained during synthesis of their individual azo dyes can also be used for dyeing directly as a liquid preparation, if appropriate after addition of a buffer substance and if appropriate also after concentration or dilution.

The present invention thus also relates to the use of the dye mixtures according to the invention for dyeing these materials and to processes for dyeing such materials by procedures which are customary per se in which a dye mixture according to the invention is employed as the coloring agent. So, the dye mixtures according to the invention are applied to and fixed on the substrates mentioned, in particular the fiber materials mentioned, by the application techniques known for water-soluble dyestuffs, in particular for fiber-reactive dyestuffs, and they are fixed on these materials in particular by the action of an alkaline reacting agent or by the action of heat or by both measures. The materials are preferably used in the form of fiber materials, in particular in the form of textile fibers, such as woven fabrics or yarns, such as in the form of hanks or wound packages.

Materials containing hydroxy groups are those of naturally occurring or synthetic origin, such as, for example, cellulose fiber materials or regenerated products thereof, and polyvinyl alcohols. Cellulose fiber materials are preferably cotton, but also other plant fibers, such as linen, hemp, jute and ramie fibers; regenerated cellulose fibers are, for example, viscose staple and filament viscose.

Materials containing carboxamide groups are, for example, synthetic and naturally occurring polyamides and polyurethanes, in particular in the form of fibers, for example wool and other animal hair, silk, leather, nylon 6,6, nylon 6, nylon 11, and nylon 4.

Dyeings with very good color yields which are improved with respect to the individual dyestuffs are those obtained with them on cellulose fibers by the exhaustion process for a long liquor ratio using the most diverse acid-binding agents and if appropriate neutral salts, such as sodium chloride or sodium sulfate. Dyeing is preferably carried out in an aqueous bath at temperatures between 40° and 105° C., if appropriate at a temperature of up to 130° C. under pressure, and if appropriate in the presence of customary dyeing auxiliaries. A procedure can be followed here in which the material is introduced into the hot bath, this is gradually heated to the desired dyeing temperature and the dyeing process is brought to completion at this temperature. If desired, the neutral salts which accelerate exhaustion of the dyestuffs can also be added to the bath only after the actual dyeing temperature has been reached.

Very good color yields and a very good color build-up are likewise obtained by the padding process on cellulose fibers, it being possible for the dyeings to be fixed in the customary manner by batching at room temperature or elevated temperature, for example up to about 60° C., by steaming or with dry heat.

Strong prints with a good contour level and a clear white background are likewise obtained by the customary printing processes for cellulose fibers, which can be carried out in one phase, for example by printing with a printing paste comprising sodium bicarbonate or another acid binding agent and subsequent steaming at 100° to 103° C., or in two phases, for example by printing with neutral or weakly acid printing ink and subsequent fixing either by passing the goods through a hot electrolyte-containing alkaline bath or by over-padding with an alkaline electrolyte-containing padding liquor and subsequent batching or steaming or dry heat treatment of the material over-padded under alkaline conditions. The printing result depends only little on the varying fixing conditions.

Hot air at 120° to 200° C. is used for fixing by means of dry heat by the customary thermofixing processes. In addition to customary steam at 101° to 103° C., it is also possible to employ superheated steam and pressurized steam at temperatures of up to 160° C.

The acid-binding agents and the agents which effect fixing of the dyestuffs of the dye mixtures according to the invention to the cellulose fibers are, for example, water-soluble basic salts of the alkali metals and likewise alkaline earth metals with inorganic or organic acids, or compounds which liberate alkali under the influence of heat. The alkali metal hydroxides and alkali metal salts of weak to moderately strong inorganic or organic acids are to be mentioned in particular, the alkali metal compounds preferably meaning sodium and potassium compounds. Such acid-binding agents are, for example, sodium hydroxide, potassium hydroxide, sodium carbonate, sodium bicarbonate, potassium carbonate, sodium formate, sodium dihydrogen phosphate, disodium hydrogen phosphate, sodium trichloroacetate, water-glass or trisodium phosphate.

The dye mixtures according to the invention are distinguished by a high fixing yield when used in dyeing and printing processes on cellulose fiber materials. After customary after-treatment by rinsing to remove non-fixed portions of dyestuff, the dyeings on cellulose show excellent wet-fastnesses, especially since non-fixed portions of dyestuff can easily be washed out because of their good solubility in cold water. The dyeings and prints obtained have clear shades; in particular, the dyeings and prints on cellulose fiber materials have a good lightfastness and very good wet-fastnesses, such as fastness to washing, milling, water, seawater, cross-dyeing and acid and alkaline perspiration, and furthermore a good fastness to pleating, fastness to ironing and fastness to rubbing.

The dye mixtures according to the invention can furthermore also be used for fiber-reactive dyeing of wool. Wool which has been given an antifelting or low-felting treatment (cf., for example, H. Rath, Lehrbuch der Textilchemie (Textbook of Textile Chemistry), Springer-Verlag, 3$^{rd}$ edition (1972), pages 295–299, in particular treatment by the so-called Hercosett process (page 298), J. Soc. Dyers and Colourists 1972, 93–99, and 1975, 33–44) can also be dyed with very good fastness properties.

The process for dyeing wool is carried out here by the customary and known dyeing procedure from an acid medium. Thus, for example, acetic acid and/or ammonium sulfate or acetic acid and ammonium acetate or sodium acetate can be added to the dyebath in order to obtain the desired pH. To achieve a usable levelness of the dyeing, it is advisable to add customary leveling auxiliaries, such as, for example, those based on a reaction product of cyanuric chloride with 3 times the molar amount of an aminobenzensulfonic acid, or based on a reaction product of, for example, stearylamine with ethylene oxide. Thus, for example, the dye mixture according to the invention is preferably first subjected to the exhaustion process from and acid dyebath with a pH of about 3.5 to 5.5, the pH being controlled, and, towards the end of the dyeing time, the pH is shifted into the neutral and, if appropriate, weakly alkaline range up to a pH of 8.5, in order to bring about a complete reactive bond between the dyestuffs of the dye mixtures and the fiber in particular to achieve good depths of color. At the same time, the dyestuff portion which has not been bonded reactively is dissolved off.

The procedure described here also applies to the production of dyeings on fiber materials of other naturally occurring polyamides or of synthetic polyamides and polyurethane. As a rule, the material to be dyed is introduced into the bath at a temperature of about 40° C. and agitated therein for some time, the dyebath is then adjusted to the desired weakly acidic pH, preferably with acetic acid, and the actual dyeing carried out at a temperature between 60° and 98° C. The dyeings can also be carried out at the boiling point or in closed dyeing apparati at temperatures of up to 106° C. Since the water-solubility of the dye mixtures according to the invention is very good, they can also advantageously be employed in customary continuous dyeing processes.

The dye mixtures according to the invention afford clear yellowish-tinged to reddish-tinged orange dyeings on the materials mentioned, preferably fiber materials.

The following Examples serve to illustrate the invention. The parts are parts by weight and the precentage data are precentages by weight, unless stated otherwise. Parts by weight bear the same relation to parts by volume as the kilogram to the liter. The compounds described by their formulae in the Examples are shown in the form of free acids; they are in general prepared and isolated in the form of their salts, in particular alkali metal salts, preferably sodium or potassium salts, and used for dyeing in the form of their salts. The starting compounds mentioned in the form of the free acid in the following Examples, can likewise be employed in the synthesis as such or in the form of their salts, preferably alkali metal salts, such as sodium or potassium salts.

ing the dye solution at reduced pressure at 50° C. An orange electrolyte-salt containing powder is obtained with a content of 90% of the sodium salt of the dye of formula (A) and 10% of the sodium salt of the dye of the formula (B), calculated on the sum of both dyes.

(A)

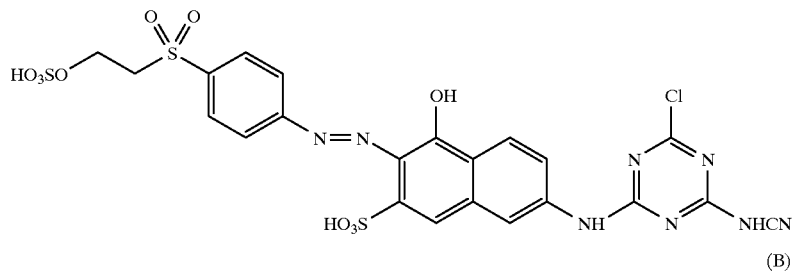

(B)

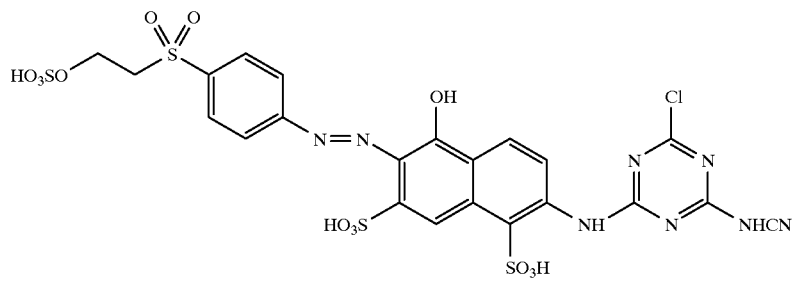

The dye mixture has very good dyestuff properties and dyes cellulose, polyamide or wool fibers in brilliant orange shades with very good fastness properties to wet processing, such as, for example an excellent fastness to washing, as well as a high resistance to steam and very good fastness to rubbing as well as to bleeding onto or soiling adjacent fabric.

EXAMPLE 1

2.1 parts of the sodium salt of cyanamide are mixed with an aqueous suspension of 9.2 parts of cyanuric chloride, carrying out the reaction of both reactants at a temperature of 0° to 10° C. and a pH of 7 to 9. Thereafter, 10.7 parts of 7-amino-4-hydroxy-naphthalene-2-sulfonic acid are added, and the reaction between the amino compound and the cyanoamino-dichloro-triazine is carried out at a temperature of 25° to 35° C. and at a pH of from 3 to 4; after this reaction has finished, 1.6 parts of 2-amino-5-hydroxy-naphthalene-1,7-disulfonic acid are added, and the reaction between said second amino compound and the residual cyanoamino-dichloro-triazine is conducted at said temperature and at a pH of from 1 to 1.7.

In a separate operation, 14 parts of 4-(β-sulfatoethylsulfonyl)-aniline are suspended in dilute aqueous hydrochloric acid and diazotized by the addition of 8.6 parts of an aqueous 40% sodium nitrite solution at a temperature of between 8° to 12° C. After excess nitrous acid has been destroyed, the resulting diazonium salt suspension is stirred into the above prepared suspension of the two naphthol coupling components at a temperature of 10° to 20° C. and at a pH of between 3 and 5.

The dye mixture according to the invention, thus obtained, is isolated from the reaction solution by evaporat-

EXAMPLE 1a

A dye mixture containing 75% of a dye of formula (A) and 25% of a dye of formula (B) is prepared in a similar manner and scale to Example 1, however, the ratio of 7-amino4-hydroxy-naphthalene-2-sulfonic acid to 2-amino-5-hydroxy-naphthalene-1,7-disulfonic acid is adjusted accordingly to obtain the required ratio of formulae (A) and (B). This mixture also exhibits very good dyestuff properties.

EXAMPLE 1b

A dye mixture containing 50% of a dye of formula (A) and 50% of a dye of formula (B) is prepared in a similar manner and scale to Example 1, however, the ratio of 7-amino4-hydroxy-naphthalene-2-sulfonic acid to 2-amino-5-hydroxy-naphthalene-1,7-disulfonic acid is adjusted accordingly to obtain the required ratio of formulae (A) and (B). This mixture also exhibits very good dyestuff properties.

EXAMPLE 1c

A dye mixture containing 25% of a dye of formula (A) and 75% of a dye of formula (B) is prepared in a similar manner and scale to Example 1, however, the ratio of 7-amino-4-hydroxy-naphthalene-2-sulfonic acid to 2-amino-5-hydroxy-naphthalene-1,7-disulfonic acid is adjusted accordingly to obtain the required ratio of formulae (A) and (B). This mixture also exhibits very good dyestuff properties.

EXAMPLE 1d

A dye mixture containing 10% of a dye of formula (A) and 90% of a dye of formula (B) is prepared in a similar manner and scale to Example 1, however, the ratio of 7-amino-4-hydroxy-naphthalene-2-sulfonic acid to 2-amino-5-hydroxy-naphthalene-1,7-disulfonic acid is adjusted accordingly to obtain the required ratio of formulae (A) and (B). This mixture also exhibits very good dyestuff properties.

EXAMPLE 2

To prepare a dye mixture according to the invention, the procedure is carried out as described in Example 1, however, employing 2-methoxy-5-(β-sulfatoethylsulfonyl)-aniline in the equimolar amount in place of the 4-(β-sulfatoethylsulfonyl)-aniline. The dye mixture obtained is an orange electrolyte-salt containing powder with a content of 90% of a dye of formula (C) and 10% of a dye of formula (D)

EXAMPLE 2c

A dye mixture containing 25% of a dye of formula (C) and 75% of a dye of formula (D) is prepared in a similar manner and scale to Example 2, however, the ratio of 7-amino4-hydroxy-naphthalene-2-sulfonic acid to 2-amino-5-hydroxy-naphthalene-1,7-disulfonic acid is adjusted accordingly to obtain the required ratio of formulae (C) and (D). This mixture also exhibits very good dyestuff properties.

EXAMPLES 3 to 20

Further dye mixtures according to the invention of monoazo dyestuffs conforming to the general formulae (1A) and (1B)

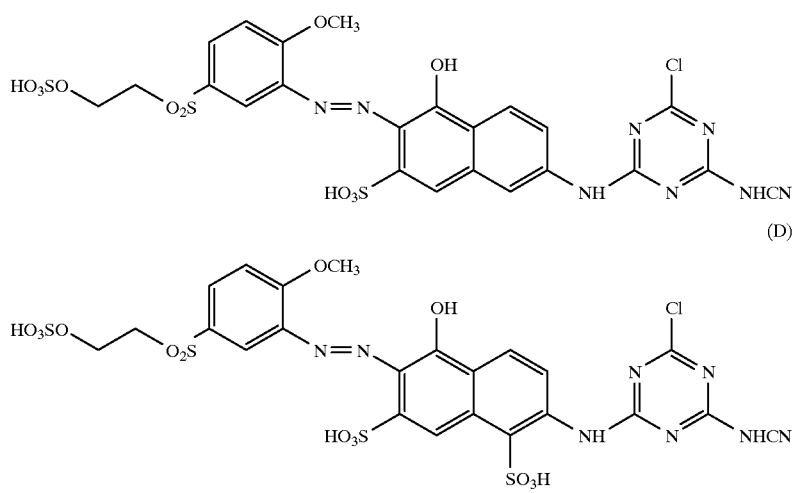

both as their sodium salts. The dye mixture exhibits extremely good dyestuff properties and dyes cotton in a brilliant orange shade.

EXAMPLE 2a

A dye mixture containing 75% of a dye of formula (C) and 25% of a dye of formula (D) is prepared in a similar manner and scale to Example 2, however, the ratio of 7-amino4-hydroxy-naphthalene-2-sulfonic acid to 2-amino-5-hydroxy-naphthalene-1,7-disulfonic acid is adjusted accordingly to obtain the required ratio of formulae (C) and (D). This mixture also exhibits very good dyestuff properties.

EXAMPLE 2b

A dye mixture containing 50% of a dye of formula (C) and 50% of a dye of formula (D) is prepared in a similar manner and scale to Example 2, however, the ratio of 7-amino4-hydroxy-naphthalene-2-sulfonic acid to 2-amino-5-hydroxy-naphthalene-1,7-disulfonic acid is adjusted accordingly to obtain the required ratio of formulae (C) and (D). This mixture also exhibits very good dyestuff properties.

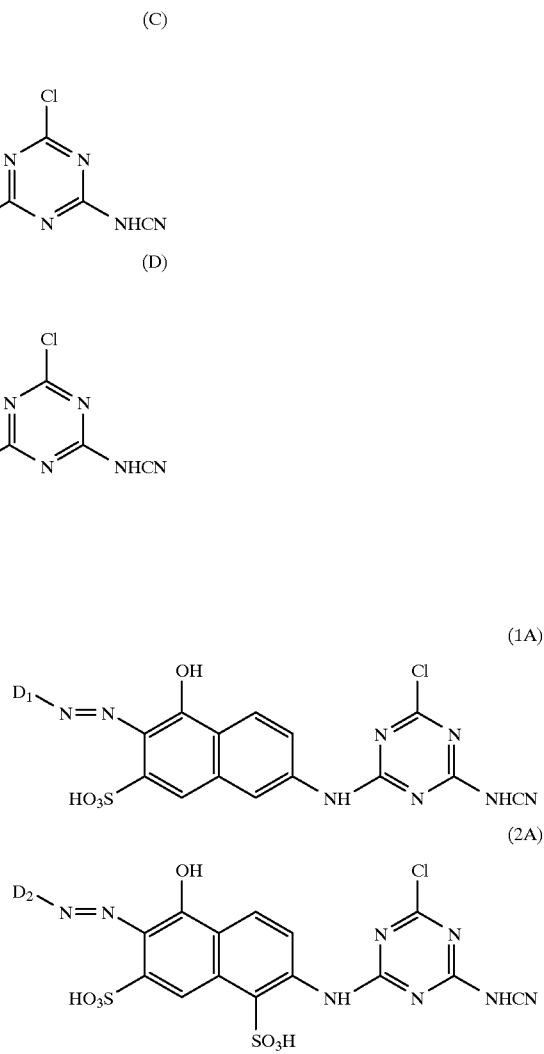

are described with the aid of their components in the following Tabular Examples. They can be prepared in the manner according to the invention either by mechanical mixing of the individual dyestuffs or else by a chemical route, for example analogously to one of the above Embodiment Examples. The numerical ratios stated in the column WR indicate the weight ratio in percent of the dyestuff or dyestuffs of the formula (1A) to the dyestuff or dyestuffs of the formula (2A) in which the dyestuffs are present in the particular dye mixture.

| Ex. | $D_1$ | $D_2$ | WR |
|---|---|---|---|
| 3 | 2-methoxy-5-methyl-4-(β-sulfatoethyl-sulfonyl)-phenyl | 2-methoxy-5-methyl-4-(β-sulfatoethyl-sulfonyl)-phenyl | 60:40 |
| 4 | 2-methoxy-5-methyl-4-(β-sulfatoethyl-sulfonyl)-phenyl | 2-methoxy-5-methyl-4-(β-sulfatoethyl-sulfonyl)-phenyl | 50:50 |
| 5 | 2-methoxy-5-methyl-4-(β-sulfatoethyl-sulfonyl)-phenyl | 2-methoxy-5-methyl-4-(β-sulfatoethyl-sulfonyl)-phenyl | 40:60 |
| 6 | 2,5-dimethoxy-4-(β-sulfatoethyl-sulfonyl)-phenyl | 2,5-dimethoxy-4-(β-sulfatoethyl-sulfonyl)-phenyl | 50:50 |
| 7 | 2,5-dimethoxy-4-(β-sulfatoethyl-sulfonyl)-phenyl | 2,5-dimethoxy-4-(β-sulfatoethyl-sulfonyl)-phenyl | 75:25 |
| 8 | 2,5-dimethoxy-4-(β-sulfatoethyl-sulfonyl)-phenyl | 2,5-dimethoxy-4-(β-sulfatoethyl-sulfonyl)-phenyl | 25:75 |
| 9 | 6-(β-sulfatoethyl-sulfonyl)-1-sulfo-naphth-2-yl | 6-(β-sulfatoethylsulfonyl)-1-sulfo-naphth-2-yl | 50:50 |
| 10 | 2-sulfo-4-(β-sulfatoethylsulfonyl)-phenyl | 2-sulfo-4-(β-sulfatoethylsulfonyl)-phenyl | 50:50 |
| 11 | 2-sulfo-4-(β-sulfatoethylsulfonyl)-phenyl | 2-sulfo-4-(β-sulfatoethylsulfonyl)-phenyl | 75:25 |
| 12 | 2-methoxy-5-methyl-4-(β-sulfatoethylsulfonyl)-phenyl | 4-(β-sulfatoethylsulfonyl)-phenyl | 90:10 |
| 13 | 2-methoxy-5-methyl-4-(β-sulfatoethylsulfonyl)-phenyl | 4-(β-sulfatoethylsulfonyl)-phenyl | 80:20 |
| 14 | 2-methoxy-5-methyl-4-(β-sulfatoethylsulfonyl)-phenyl | 2-sulfo-4-(β-sulfatoethylsulfonyl)-phenyl | 90:10 |
| 15 | 2-methoxy-5-methyl-4-(β-sulfatoethylsulfonyl)-phenyl | 2-sulfo-4-(β-sulfatoethylsulfonyl)-phenyl | 80:20 |
| 16 | 3-(β-sulfatoethylsulfonyl)-phenyl | 3-(β-sulfatoethylsulfonyl)-phenyl | 60:40 |
| 17 | 3-(β-sulfatoethylsulfonyl)-phenyl | 3-(β-sulfatoethylsulfonyl)-phenyl | 50:50 |
| 18 | 3-(β-sulfatoethylsulfonyl)-phenyl | 3-(β-sulfatoethylsulfonyl)-phenyl | 40:60 |
| 19 | 4-vinylsulfonyl-phenyl | 4-vinylsulfonyl-phenyl | 50:50 |
| 20 | 3-vinylsulfonyl-phenyl | 3-vinylsulfonyl-phenyl | 50:50 |

The dyes of the invention were evaluated by exhaust dyeing cotton test specimens. Exhaust dyeing is well known in the art. Various dye mixtures described in this invention were dyed over a set of defined concentrations versus the individual dyestuffs of the dye mixtures. The mixtures of dyes and the individual dyes were initially normalized by color strength (by use of molar extinction coefficients) to the dye represented by Formula A. The color yield of each dyeing was evaluated by a computer assisted spectrophotometric method known in the art. The color yield is expressed in color density units (CDU's). The results of these tests are listed in Tables 1 to 3.

TABLE 1

Color Yield in CDU's

| % Dye | Dye of formula (A) | Dye of formula (B) | 75%:25% mixture of Dyes (A) and (B); Example 1a |
|---|---|---|---|
| 0.5 | 0.52 | 0.55 | 0.56 |
| 1.0 | 0.93 | 1.02 | 0.99 |

TABLE 1-continued

Color Yield in CDU's

| % Dye | Dye of formula (A) | Dye of formula (B) | 75%:25% mixture of Dyes (A) and (B); Example 1a |
|---|---|---|---|
| 2.0 | 1.66 | 1.54 | 1.77 |
| 4.0 | 2.48 | 2.45 | 2.70 |
| 6.0 | 2.81 | 2.87 | 3.14 |
| 8.0 | 3.12 | 2.95 | 3.36 |
| 10.0 | 3.01 | 3.10 | 3.50 |

TABLE 2

Color Yield in CDU's

| % Dye | Dye of formula (A) | Dye of formula (B) | 50%:50% mixture of Dyes (A) and (B); Example 1b |
|---|---|---|---|
| 0.5 | 0.52 | 0.55 | 0.55 |
| 1.0 | 0.93 | 1.02 | 0.99 |
| 2.0 | 1.66 | 1.54 | 1.61 |
| 4.0 | 2.48 | 2.45 | 2.75 |
| 6.0 | 2.81 | 2.87 | 3.01 |
| 8.0 | 3.12 | 2.95 | 3.36 |
| 10.0 | 3.01 | 3.10 | 3.40 |

TABLE 3

Color Yield in CDU's

| % Dye | Dye of formula (A) | Dye of formula (B) | 25%:75% mixture of Dyes (A) and (B); Example 1c |
|---|---|---|---|
| 0.5 | 0.52 | 0.55 | 0.55 |
| 1.0 | 0.93 | 1.02 | 0.91 |
| 2.0 | 1.66 | 1.54 | 1.66 |
| 4.0 | 2.48 | 2.45 | 2.50 |
| 6.0 | 2.81 | 2.87 | 3.00 |
| 8.0 | 3.12 | 2.95 | 3.33 |
| 10.0 | 3.01 | 3.10 | 3.30 |

The results set forth in Tables 1 to 3 show that, at 4.0 to 10.0% dye concentration, the color yields of the dyestuff mixtures according to the invention (Examples 1a, 1b, and 1c) are suprisingly significantly higher than the average of the sum of the color yields given by the individual dyestuffs of formulae (A) and (B).

What is claimed:

1. A dye mixture comprising one or more monoazo dyestuffs corresponding to the general formula (1) and one or more monoazo dyestuffs corresponding to the general formula (2) in a mixing ratio of 75:25% by weight to 25:75% by weight (1)

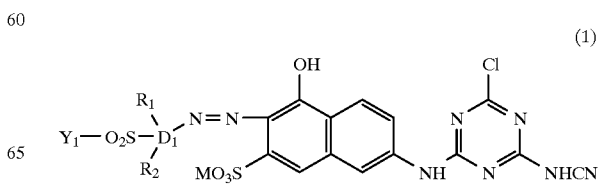

-continued

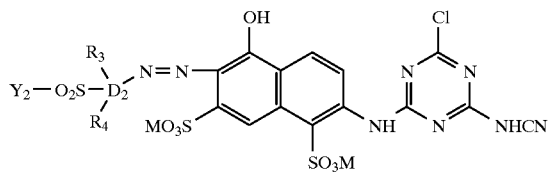

(2)

in which:
- $D_1$ is the radical of a benzene or naphthalene nucleus;
- $D_2$ has one of the meanings of of $D_1$;
- $R_1$ is hydrogen, methyl, ethyl, methoxy, ethoxy, sulfo or carboxy, if $D_1$ or $D_2$ or both are a benzene radical, and is, if $D_1$ or $D_2$ or both are a naphthalene radical, hydrogen, sulfo or carboxy;
- $R_2$ is hydrogen, methyl, ethyl, methoxy, ethoxy, sulfo or carboxy, if $D_1$ or $D_2$ or both are a benzene radical, and is, if $D_1$ or $D_2$ or both are a naphthalene radical, hydrogen, sulfo or carboxy;
- $R_3$ is hydrogen, methyl, ethyl, methoxy, ethoxy, sulfo or carboxy, if $D_1$ or $D_2$ or both are a benzene radical, and is, if $D_1$ or $D_2$ or both are a naphthalene radical, hydrogen, sulfo or carboxy;
- $R_4$ is hydrogen, methyl, ethyl, methoxy, ethoxy, sulfo or carboxy, if $D_1$ or $D_2$ or both are a benzene radical, and is, if $D_1$ or $D_2$ or both are a naphthalene radical, hydrogen, sulfo or carboxy;
- $Y_1$ is vinyl or is ethyl which is substituted in the β-position by a substituent which is eliminated by the action of an alkali, forming the vinyl group;
- $Y_2$ has one of the meanings of $Y_1$;
- M is hydrogen or an alkali metal.

2. A process for dyeing hydroxy-and/or carboxamido-containing fiber material which comprises applying and fixing the dye mixture as claimed in claim 1 to the material by means of heat or with the aid of an alkali or by means of heat and with the aid of an alkali.

3. A dye mixture according to claim 1, wherein the group(s) —$SO_2$—Y being bonded to the benzene nucleus in para-position to the azo group(s).

4. A dye mixture as claimed in claim 1, in which $D_1$ and $D_2$ are both the radical of a benzene nucleus.

5. A dye mixture as claimed in claim 4, in which $R_1$ is hydrogen, methoxy or methyl, $R_2$ is hydrogen or methoxy, $R_3$ is hydrogen, methoxy or methyl and $R_4$ is hydrogen or methoxy.

6. A dye mixture as claimed in claim 4, in which $R^1$, $R^2$, $R^3$ and $R^4$ is each hydrogen.

7. A dye mixture according to claim 1, wherein Y is in each instance, independently of the others, vinyl or is ethyl substituted in the β-position by chlorine, thiosulfato, sulfato, alkanoyloxy of 2 to 5 carbon atoms, phosphato, sulfobenzoyloxy or p-toluylsulfonyloxy.

8. A dye mixture according to claim 1, wherein Y is in each instance, independently of the others, vinyl or β-sulfatoethyl.

9. A dye mixture according to claim 1, wherein the group(s) —$SO_2$—Y being bonded to the benzene nucleus in meta- or para-position to the azo group(s).

10. A dyestuff mixture as claimed in claim 1, comprising one or more azo dyestuffs corresponding to the formula (1) and one or more azo dyestuffs corresponding to the formula (2) in a mixing ratio of 60:40% by weight to 40:60% by weight.

11. A dyestuff mixture as claimed in claim 1 comprising one or more azo dyestuffs corresponding to the formula (1) and one or more azo dyestuffs corresponding to the formula (2) in a mixing ratio of 70:30% by weight to 30:70% by weight.

* * * * *